(12) United States Patent
Ciacci et al.

(10) Patent No.: US 6,575,576 B1
(45) Date of Patent: Jun. 10, 2003

(54) METHOD AND APPARATUS FOR INCREASING THE SPATIAL RESOLUTION OF A PROJECTED PIXELATED DISPLAY

(75) Inventors: Claudio Ciacci, White Plains, NY (US); Alan P. Cavallerano, White Plains, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/161,011

(22) Filed: Jun. 3, 2002

(51) Int. Cl.⁷ .................................................. G03B 2/26
(52) U.S. Cl. ........................................................ 353/30
(58) Field of Search ............................. 353/30, 94, 97, 353/122; 349/5, 7, 110; 348/740, 833, 841; 345/43

(56) References Cited

U.S. PATENT DOCUMENTS 6,017,123 A * 1/2000 Bleha et al. .................. 353/30
6,480,175 B1 * 11/2002 Schneider ..................... 345/32
6,513,938 B2 * 2/2003 Kubota et al. ................. 353/94

* cited by examiner

*Primary Examiner*—William Dowling
(74) *Attorney, Agent, or Firm*—Michael E. Belk (57) ABSTRACT

A pixelated image display system comprising: a first panel including an array of pixel elements, each pixel element partially masked by an opaque region; one or more additional panels, each additional panel including an array of pixel elements, each pixel element partially masked by an opaque region; means for directing a different subset of pixel data from an image dataset to each the panel to control the pixel elements of each panel; and means for aligning and projecting interleaved pixel elements, in at least one of the horizontal and vertical directions, from each panel onto a screen to form a pixelated image.

25 Claims, 10 Drawing Sheets

METHOD AND APPARATUS FOR INCREASING THE SPATIAL RESOLUTION OF A PROJECTED PIXELATED DISPLAY

FIELD OF THE INVENTION

The present invention relates to the field of projected pixelated displays; more specifically, it relates to a method and an apparatus for increasing the resolution of projected pixelated images.

BACKGROUND OF THE INVENTION

In a pixelated display system, light is either, depending upon the type of display panel used by the system, reflected from the display panel or passed through the display panel, directed through an optical system and projected on a screen to form an image. Each display panel includes an array of pixel elements that either selectively reflect the light onto or away from the optical system in the case of a reflected light system, or selectively block or transmit light in the case of a transmissive system. The array elements are controlled based on electronic data created from the original image, the image being broken into equal area pixels, the number of pixels being equal to the number of pixel elements in the display panel.

The resolution of a given display panel is limited by the number of discrete pixel elements of the display panel. For example, a "1280 by 1024" display can deliver no more than 1280 pixel elements horizontally and no more than 1024 lines of pixel elements vertically. Ultimately, the number of pixels in a given display panel is limited by the physical size of each pixel element in the display panel. Currently, to increase the resolution of a projected image either the display screen must be in increased in size or the pixel element size must be reduced in order to increase the pixel density. Both these solutions present problems. As the size of display panels increases, size, weight and power consumption become issues as well as manufacturability and cost. Reduction of pixel element size is limited by semiconductor technology and becomes progressively more expensive as pixel size decreases. Further, a higher density of pixels results in less output per pixel and produces a projected image with reduced overall light output and poor contrast.

SUMMARY OF THE INVENTION

A first aspect of the present invention is a pixelated image display system comprising: a first panel including an array of pixel elements, each pixel element partially masked by an opaque region; one or more additional panels, each additional panel including an array of pixel elements, each pixel element partially masked by an opaque region; means for directing a different subset of pixel data from an image dataset to each panel to control the pixel elements of each panel; and means for aligning and projecting interleaved pixel elements, in at least one of the horizontal and vertical directions, from each panel onto a screen to form a pixelated image.

A second aspect of the present invention is a pixelated image display apparatus comprising: a first panel comprising an array of pixel elements and a mask having opaque regions and transparent regions overlaying the array, each pixel element partially masked by a portion of one of the opaque regions of the mask; one or more additional panels, each additional panel comprising an array of pixel elements and a mask having opaque regions and transparent regions overlaying the array, each pixel element partially masked by a portion of one of the opaque regions of the mask; and means to interleave images of each panel and project the resultant interleaved image.

A third aspect of the present invention is a method of forming a pixelated image comprising: providing a first panel comprising an array of pixel elements and a mask having opaque regions and transparent regions overlaying the array, each pixel element partially masked by a portion of one of the opaque regions of the mask; providing one or more additional panels, each additional panel comprising an array of pixel elements and a mask having opaque and transparent regions overlaying the array, each pixel element partially masked by a portion of one of the opaque regions of the mask; and projecting an interleaved images of the images formed on each panel.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

FIGS. 1A–1C, 2A–2C and 3 illustrate the basic principle of the present invention and form the first embodiment of the present invention.

Figure 1A:
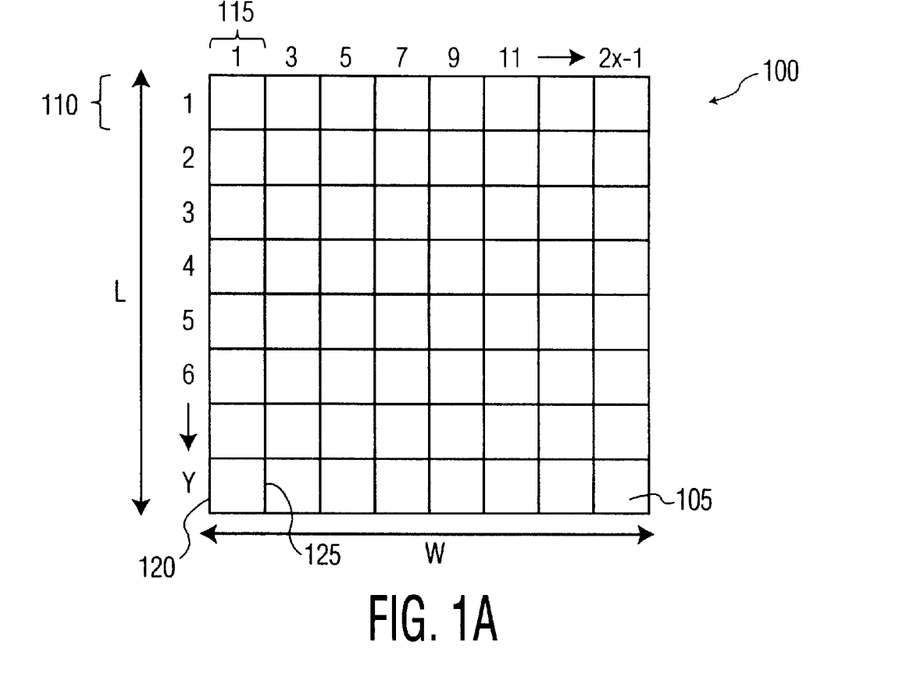
FIG. 1A is a schematic diagram of a first pixel array according to the present invention.

FIG. 1A is a schematic diagram of a first pixel array according to the present invention. In FIG. 1A, a first array 100 includes a multiplicity of equally sized pixel elements 105 arranged in rows 110 and columns 115. First array 100 has a length "L" and a width "W." There are 2X−1 columns 115 in the "W" or horizontal direction and Y rows 110 in the "L" or vertical direction. Each pixel 105 has a first vertical edge 120 and an opposite second vertical edge 125. Columns 115 are numbered sequentially by odd integers in the "W" direction and rows 110 are numbered sequentially by integers in the "L" direction. First array 100 may be a transmissive array such as a transmissive liquid crystal display (TLCD) or a reflective array such as a deformable mirror device (DMD), liquid crystal on silicon (LCOS) device or a reflective liquid crystal display (RLCD).

Figure 1B:
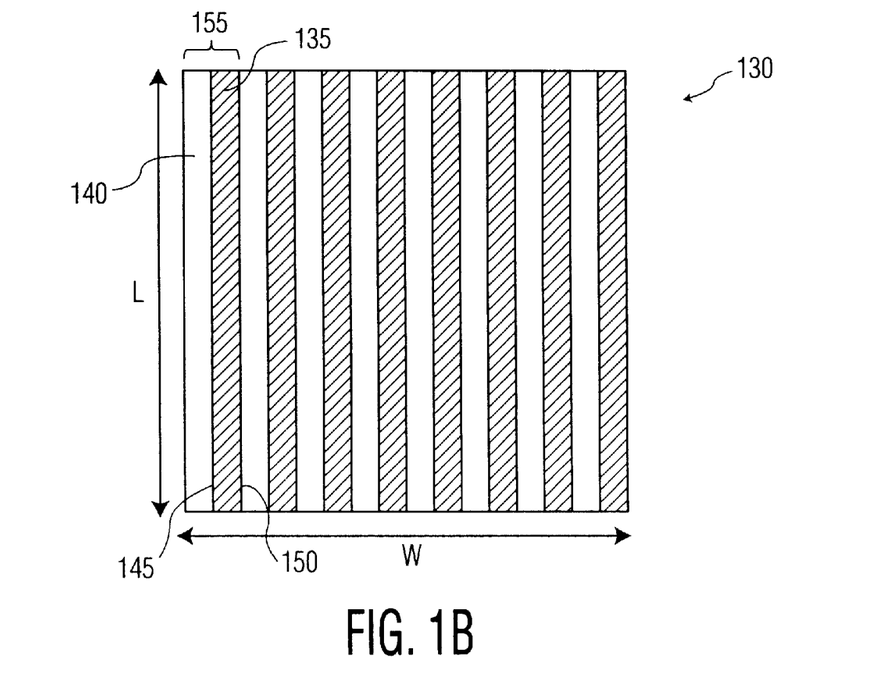
FIG. 1B is a schematic diagram of a first array mask according to the present invention.

FIG. 1B is a schematic diagram of a first array mask according to the present invention. In FIG. 1B, a first mask 130 includes a multiplicity of opaque regions 135, equally spaced apart and interspersed by transparent regions 140. First mask 130 also has a length "L" and a width "W." Both opaque regions 135 and transparent regions 140 extend in the "L" direction and in the present example, form a vertical stripe pattern starting with a transparent region 140. Each opaque region 135 has a first vertical edge 145 and an opposite second vertical edge 150. One transparent region 140 and an adjacent opaque region 135 form a transparent/opaque region pair 155. Each transparent/opaque region pair 155 is the same width as each column 115.

Figure 1C:
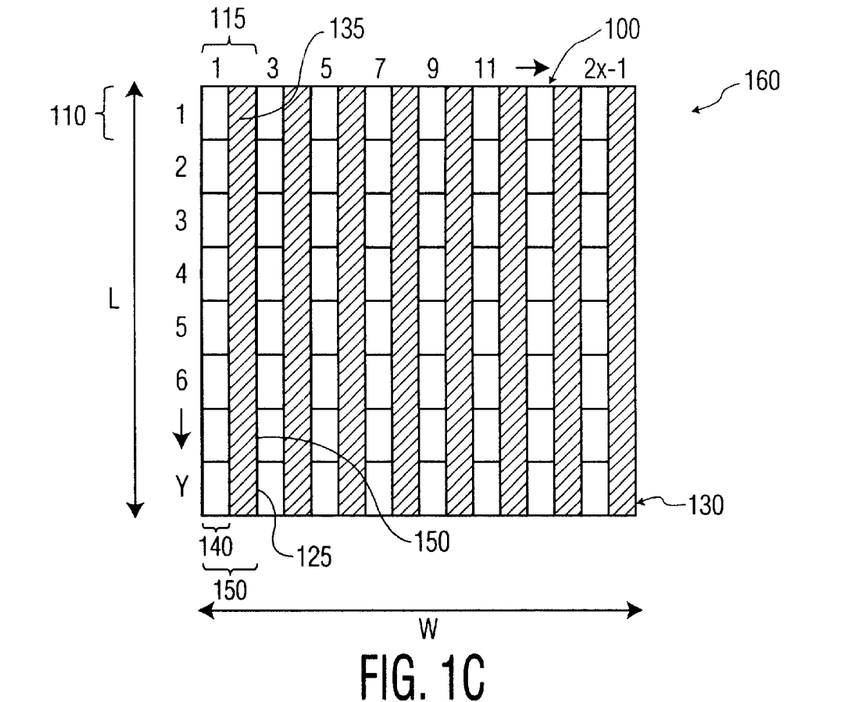
FIG. 1C is a schematic diagram of a first display panel according to the present invention.

FIG. 1C is a schematic diagram of a first display panel according to the present invention. In FIG. 1C, first mask 130 of FIG. 1B is overlaid on first array 100 of FIG. 1A to form a first panel 160. First panel 160 also has a length "L" and a width "W." Each opaque region 135 of first mask 130 covers a portion of each column 115 of first array 100, the second vertical edge 150 of each opaque region 135 being aligned to the second vertical edge 125 of the pixel elements 105 in column 115 so as to expose only a portion of each pixel 105 though transparent regions 140.

Figure 2A:
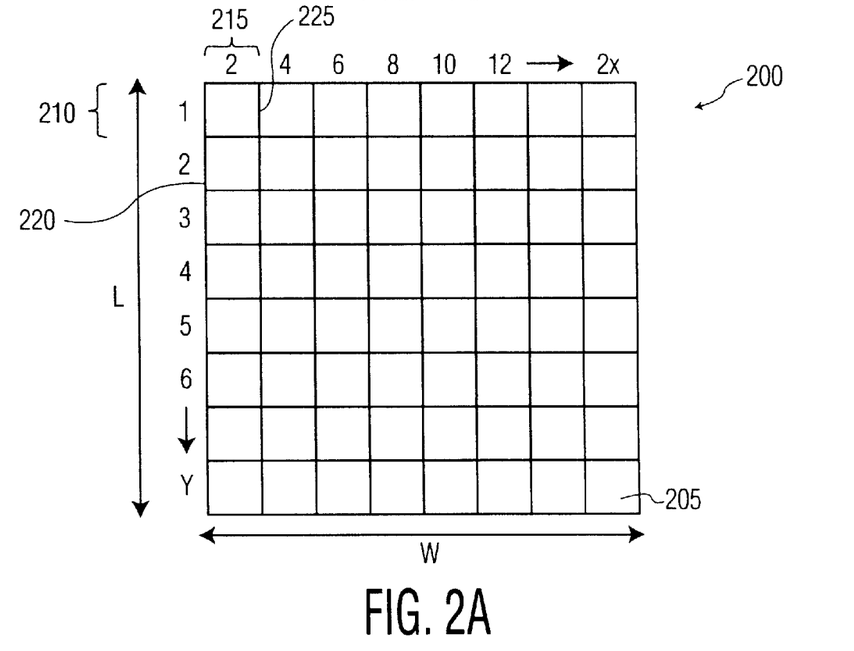
FIG. 2A is a schematic diagram of a second pixel array according to the present invention.

FIG. 2A is a schematic diagram of a second pixel array according to the present invention. In FIG. 2A, a second array 200 includes a multiplicity of equally pixel elements 205 arranged in rows 210 and columns 215. The size of pixel elements 205 is the same as the size of pixel elements 105 of FIG. 1A. First array 200 also has a length "L" and a width "W." There are 2X columns 215 in the "W" or horizontal direction and Y rows 210 in the "L" or vertical direction. Each pixel 205 has a first vertical edge 220 and an opposite second vertical edge 225. Columns 215 are numbered sequentially by even integers in the "W" direction and rows 210 are numbered sequentially by integers in the "L" direction. Second array 200 may be a transmissive array such as a transmissive liquid crystal display (TLCD) or a reflective array such as a deformable mirror device (DMD), liquid crystal on silicon (LCOS) device or a reflective liquid crystal display (RLCD).

Figure 2B:
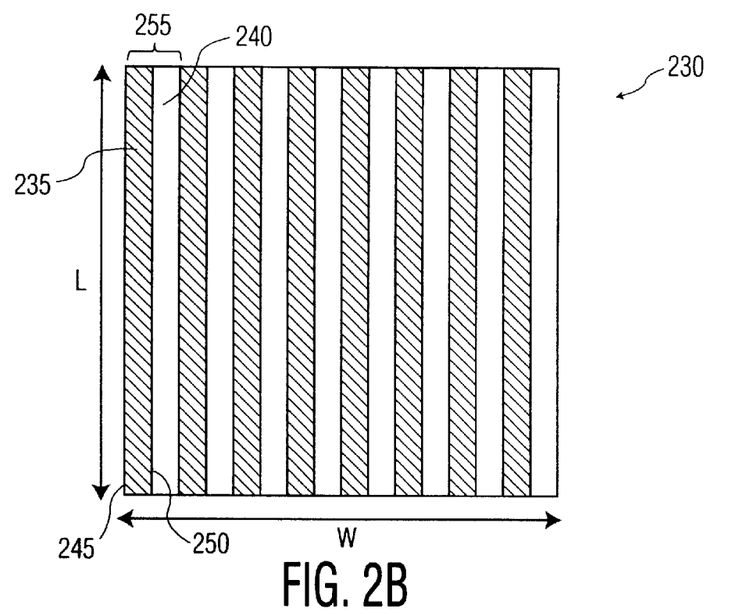
FIG. 2B is a schematic diagram of a second array mask according to the present invention.

FIG. 2B is a schematic diagram of a second array mask according to the present invention. In FIG. 2B, a second mask 230 includes a multiplicity of opaque regions 235, equally spaced apart and interspersed by transparent regions 240. First mask 230 also has a length "L" and a width "W." Both opaque regions 235 and transparent regions 240 extend in the "L" direction and in the present example, form a vertical stripe pattern starting with an opaque region 235. Each opaque region 235 has a first vertical edge 245 and an opposite second vertical edge 250. One opaque region 235 and an adjacent transparent region 240 form an opaque/transparent region pair 255. Each opaque/transparent region pair 255 is the same width as each column 215.

Figure 2C:
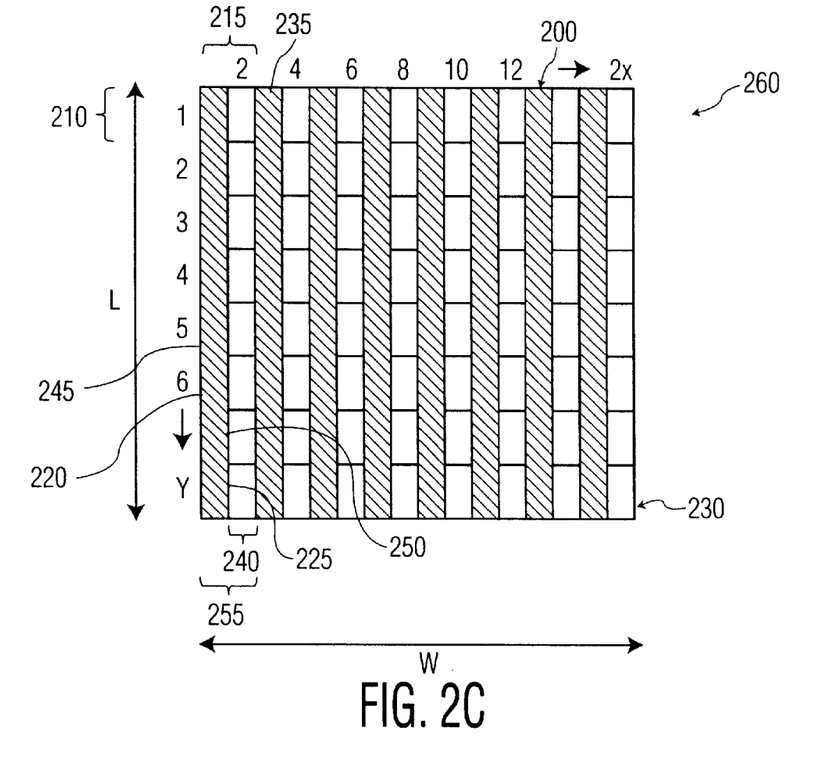
FIG. 2C is a schematic diagram of a second display panel according to the present invention.

FIG. 2C is a schematic diagram of a second display panel according to the present invention. In FIG. 2C, second mask 230 of FIG. 2B is overlaid on second array 200 of FIG. 2A to form a second panel 260. Second panel 260 also has a length "L" and a width "W." Each opaque region 235 of second mask 230 covers a portion of each column 215 of second array 200, the first vertical edge 245 of each opaque region 235 being aligned to the second vertical edge 225 of the pixel elements 205 in the column 215 below so as to expose only a portion of each pixel 205 though transparent regions 240.

Figure 3:
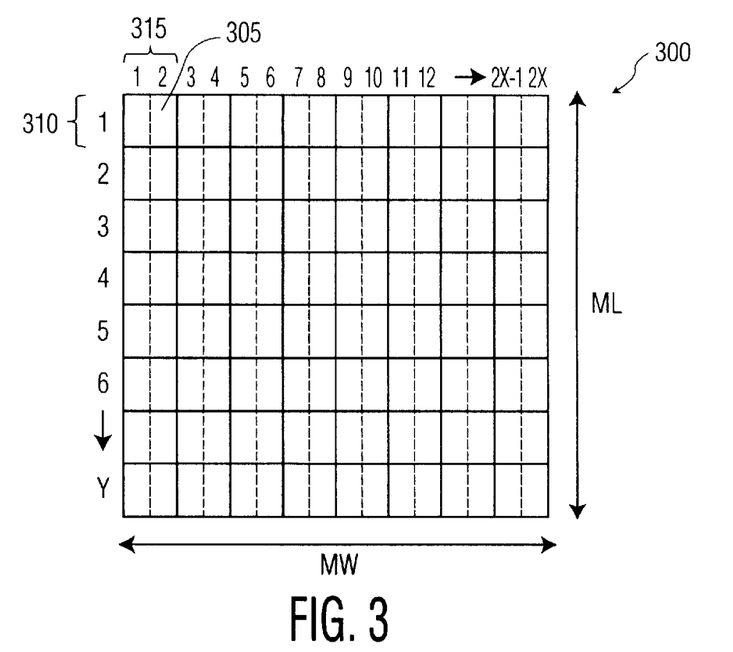
FIG. 3 is a schematic diagram of a projected image according to the present invention.
Figure 4:
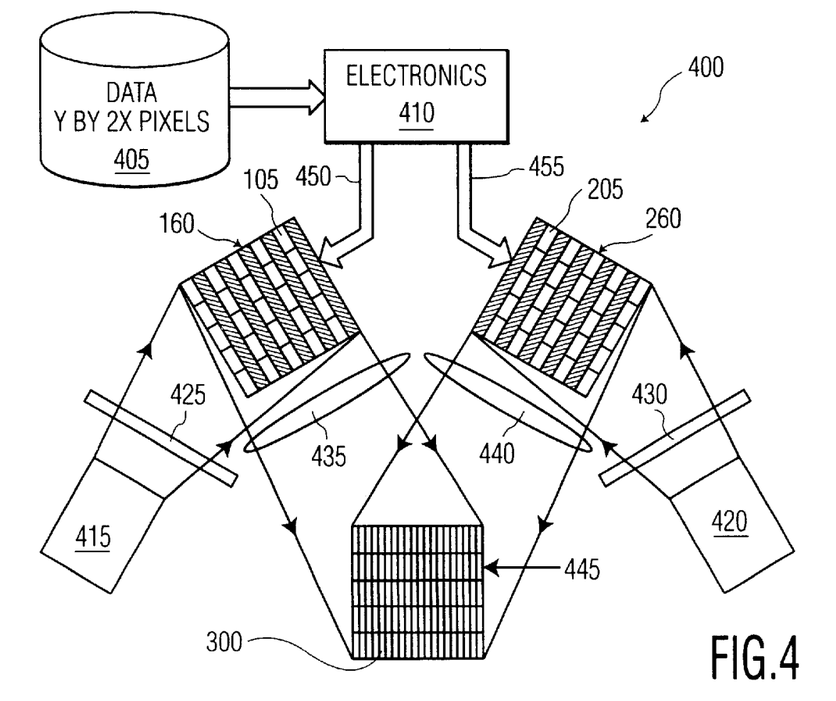
FIG. 4 is a schematic perspective view of a projected display system incorporating display panels in accordance with the present invention.

FIG. 3 is a schematic diagram of a projected image according to the present invention. First and second panels 160 and 260 of FIGS. 1C and 2C respectively, are used in a projection system, an example of which is illustrated in FIG. 4 and described infra, to produce an interleaved image 300. In FIG. 3, interleaved image 300 includes a multiplicity of equally sized pixels 305 arranged in rows 310 and columns 315. Interleaved image 300 has a length "ML" and a width "MW," where M is a magnification factor applied to "L" and "W" that may be less than, equal to, or greater than one. There are 2X columns 315 in the "MW" or horizontal direction and Y rows 310 in the "ML" or vertical direction. Pixels in odd number columns 315 have been projected from first panel 160 (see FIG. 1C) and pixels in even number columns have been projected from second panel 260 (see FIG. 2C).

Interleaved image 300 has twice as many pixels in the horizontal direction has would have been obtained by projecting either first panel 160 alone or second panel 260 alone. The total brightness of each pixel 305 is half that of pixels that would be formed by projecting either pixel elements 105 alone (see FIG. 1A) or pixel elements 205 alone (see FIG. 2A), but since there are twice as many pixels 305, the brightness of interleaved image 300 is the same as would have been obtained by projecting either first panel 160 alone or second panel 260 alone.

FIG. 4 is a schematic perspective view of a projected display system incorporating display panels in accordance with the present invention. In FIG. 4, display system 400 includes an image dataset 405, electronics 410, first and second light sources 415 and 420, optionally first and second color wheels 425 and 430, first and second panels 160 and 260 and first and second lenses 435 and 440 producing interleaved image 300 on screen 445.

In the present example, image dataset 405 contains a single pixelated frame (for a still picture) or a series of pixelated frames (for a video picture) having Y vertical and 2X horizontal pixels per frame. Each frame of data is split by electronics 410 into an odd data stream 450 containing only the odd columns of pixels and an even data stream 454 containing only the even columns of pixels. Odd data stream 450 controls pixel elements 105 in first panel 160 and even data stream 455 controls pixel elements 205 in second panel 260.

Light from first light source 415, shining on first panel 160 is reflected by first panel 160 and focused by first lens 435 on screen 445 to produce a first portion of interleaved image 300. Light from second light source 420, shining on second panel 260 is reflected by second panel 260 and focused by second lens 440 on screen 445 to produce the second half of interleaved image 300. The half images are interleaved as illustrated in FIG. 3 and described supra, to produce a complete frame.

Optional first and second color wheels 425 and 430 may be used to produce color images from a dataset having three sets of data (red, blue and green) sequentially sent to first and second panels 160 and 260 by electronics 410. Alternatively, color may be obtained by using six panels in pairs of first panels 160 and second panels 260, sending appropriate data streams to each panel, and optically focusing the light reflected by each panel onto screen 445.

A transmitted light system may be substituted when first and second panels are transmissive rather than reflective by positioning the light sources behind the panels so that the light is blocked by opaque pixel elements and light passing through transparent pixel elements is then focused on the screen. The present embodiment may be applied to the vertical direction instead of the horizontal, as one skilled in the art will recognize.

Figure 5A:
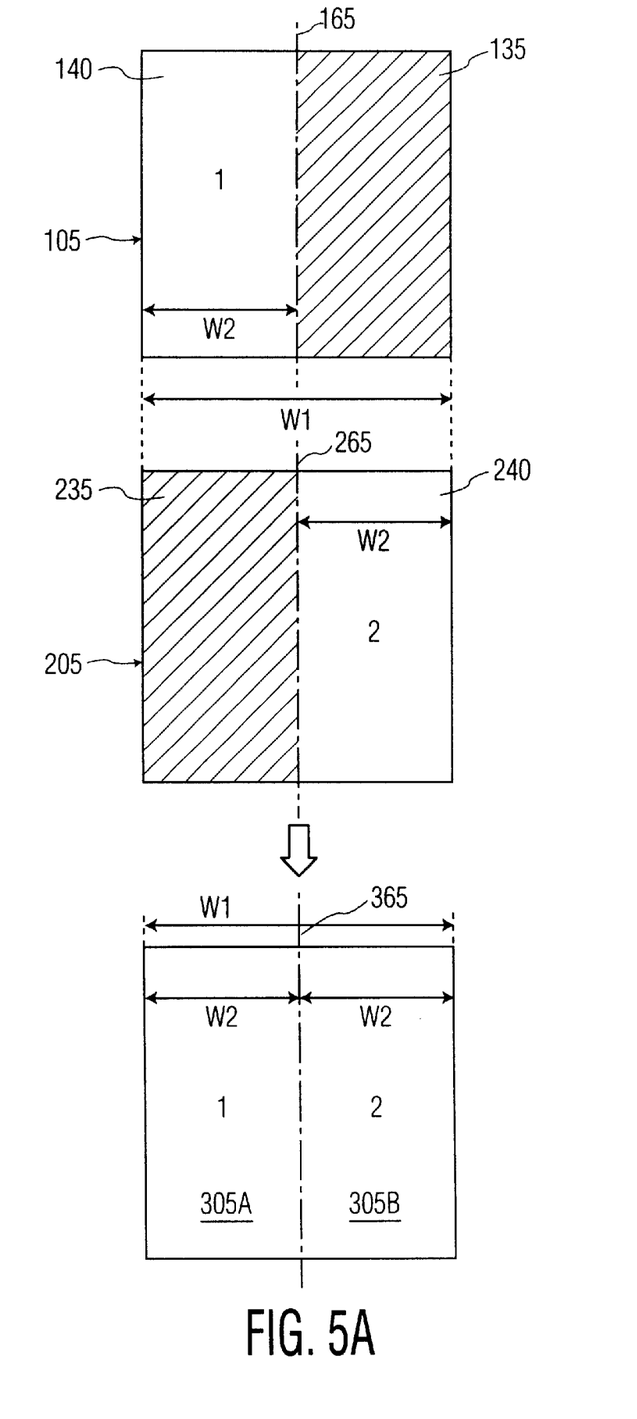
FIG. 5A is a detailed schematic diagram illustrating formation of increased resolution projected pixels according to a first embodiment of the present invention.

FIG. 5A is a detailed schematic diagram illustrating formation of increased resolution projected pixels according to the first embodiment of the present invention. In FIG. 5A, on first panel 160 (see FIG. 1C), pixel element 105 is partially masked by opaque region 135 and exposed through transparent region 140 of first mask 130 (see FIG. 1B). Transparent region 140 and opaque region 135 meet along virtual reference line 165. Pixel element 105 has a width "W1" and a width "W2" of pixel element 105 is exposed. "W2"="W1"/2.

On second panel 260 (see FIG. 2C), pixel element 205 is partially masked by opaque region 235 and exposed through transparent region 240 of second mask 230 (see FIG. 2B). Transparent region 240 and opaque region 235 meet along virtual reference line 265. Pixel element 205 also has a width "W1" and a width "W2" of pixel element 205 is exposed. "W2"="W1"/2

Pixel element 105 is projected to form pixel 305A and pixel element 205 is projected to form pixel 305B, the projection is done in a manner to superimpose virtual reference line 165 over virtual reference line 265 to produce virtual reference line 365.

The first embodiment of the present invention may be applied to the vertical direction instead of the horizontal, as one skilled in the art will recognize.

Figure 5B:
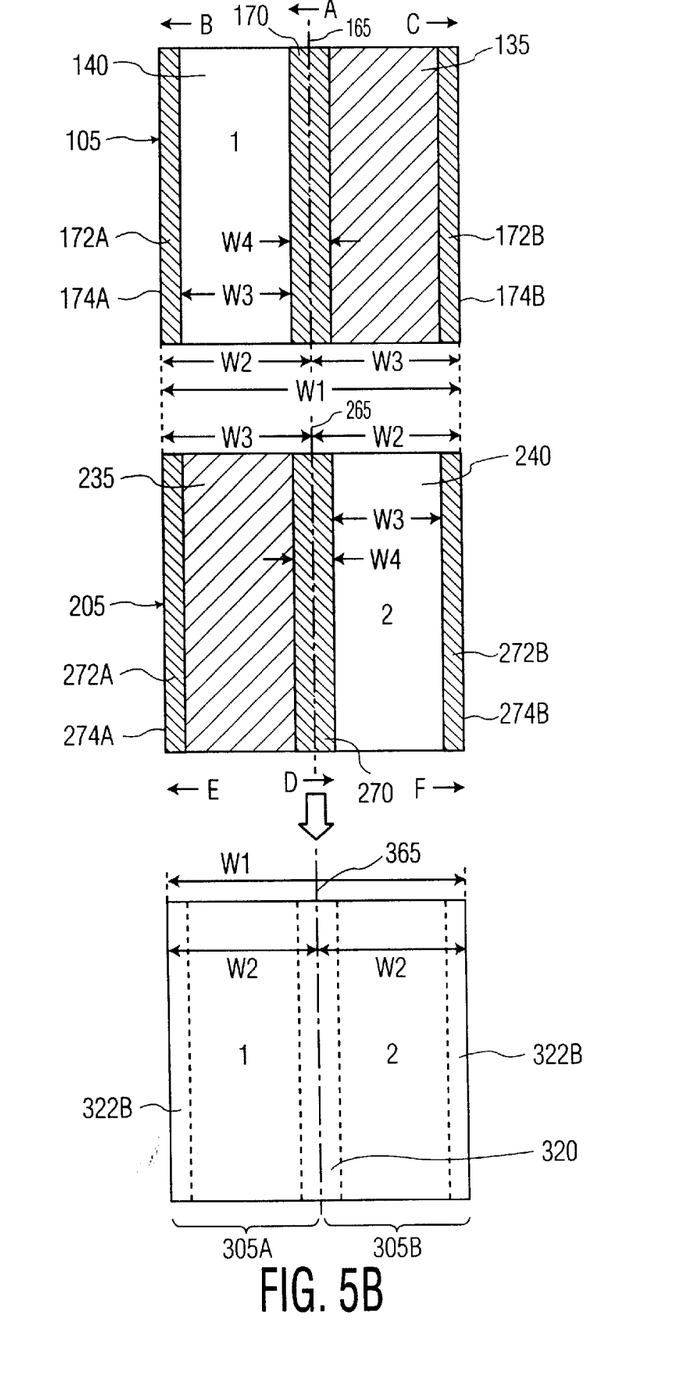
FIG. 5B is a detailed schematic diagram illustrating formation of increased resolution projected pixels according to a second embodiment of the present invention.

FIG. 5B is a detailed schematic diagram illustrating formation of increased resolution projected pixels according to a second embodiment of the present invention. In FIG. 5B, on first panel 160 (see FIG. 1C), pixel element 105 is partially masked by opaque region 135 and exposed through transparent region 140. Opaque region 135 and transparent region 140 are separated by a transition region 170 centered on virtual reference line 165. Transition region 170 is graded from opaque (optical density of opaque region 135) to transparent (optical density of transparent region 140) in the "A" direction. The optical density of transition region 170 along virtual reference line 165 is half of the sum of the optical density of opaque region 135 and the optical density of transparent region 140. Transparent region 140 and opaque region 135 are equally spaced from virtual reference line 165.

A second transition region 172A is located along an edge 174A of transparent region 140 and is half as wide as transition region 170. Transition region 172A is graded from transparent (optical density of transparent region 140) an optical density equal to half of the sum of the optical density of opaque region 135 and the optical density of transparent region 140 in the "B" direction.

A third transition region 172B is located along an edge 174B of opaque region 135 and is half as wide as transition region 170. Transition region 172B is graded from opaque (optical density of opaque region 135) to an optical density equal to half of the sum of the optical density of opaque region 135 and the optical density of transparent region 140 in the "C" direction.

Transition regions 170, 172A and 172B and all subsequently described transition regions are fabricated as part of the corresponding mask along with the opaque regions or alternatively may be fabricated on a second mask applied to the array. Pixel element 105 has a width "W1" and a width "W3" of pixel element 105 is exposed. Transition region 170 has a width "W4." "W4" maybe between about 0 to 20% of "W1." "W2"=("W3"+"W4"/2)="W1"/2.

On second panel 260 (see FIG. 2C), pixel element 205 is partially masked by opaque region 235 and exposed through transparent region. Opaque region 235 and transparent region 240 are separated by a transition region 270 centered on virtual reference line 265. Transition region 270 is graded from opaque (optical density of opaque region 235) to transparent (optical density of transparent region 240) in the "D" direction. The optical density of transition region 270 along virtual reference line 265 is half of the sum of the optical density of opaque region 235 and the optical density of transparent region 240. Transparent region 240 and opaque region 235 are equally spaced from virtual reference line 265.

A second transition region 272A is located along an edge 274A of transparent region 240 and is half as wide as transition region 270. Transition region 272A is graded from transparent (optical density of transparent region 240) an optical density equal to half of the sum of the optical density of opaque region 235 and the optical density of transparent region 240 in the "E" direction.

A third transition region 272B is located along an edge 274B of opaque region 235 and is half as wide as transition region 270. Transition region 272B is graded from opaque (optical density of opaque region 235) to an optical density equal to half of the sum of the optical density of opaque region 235 and the optical density of transparent region 240 in the "F" direction.

Transition region 270 has a width "W4." "W4" may be between about 0 to 20% of "W1." The "B" direction is the opposite direction from the "A" direction. "W2"=("W3"+"W4"/2)="W1"/2.

Pixel element 105 is projected to form pixel 305A and pixel element 205 is projected to form pixel 305B, the projection is done in a manner to superimpose virtual reference line 165 over virtual reference line 265 to produce virtual reference line 365. Pixel 305A overlaps pixel 305B in overlap regions 320, 322A and 322B. The overlap region minimizes frame distortion caused by misalignment of the optical projection system.

The second embodiment of the present invention may be applied to the vertical direction instead of the horizontal, as one skilled in the art will recognize.

The third and fourth embodiments of the present invention address the situation where pixel elements contain non-reflective or non-transmissive mechanical support or circuit substructures.

Figure 6A:
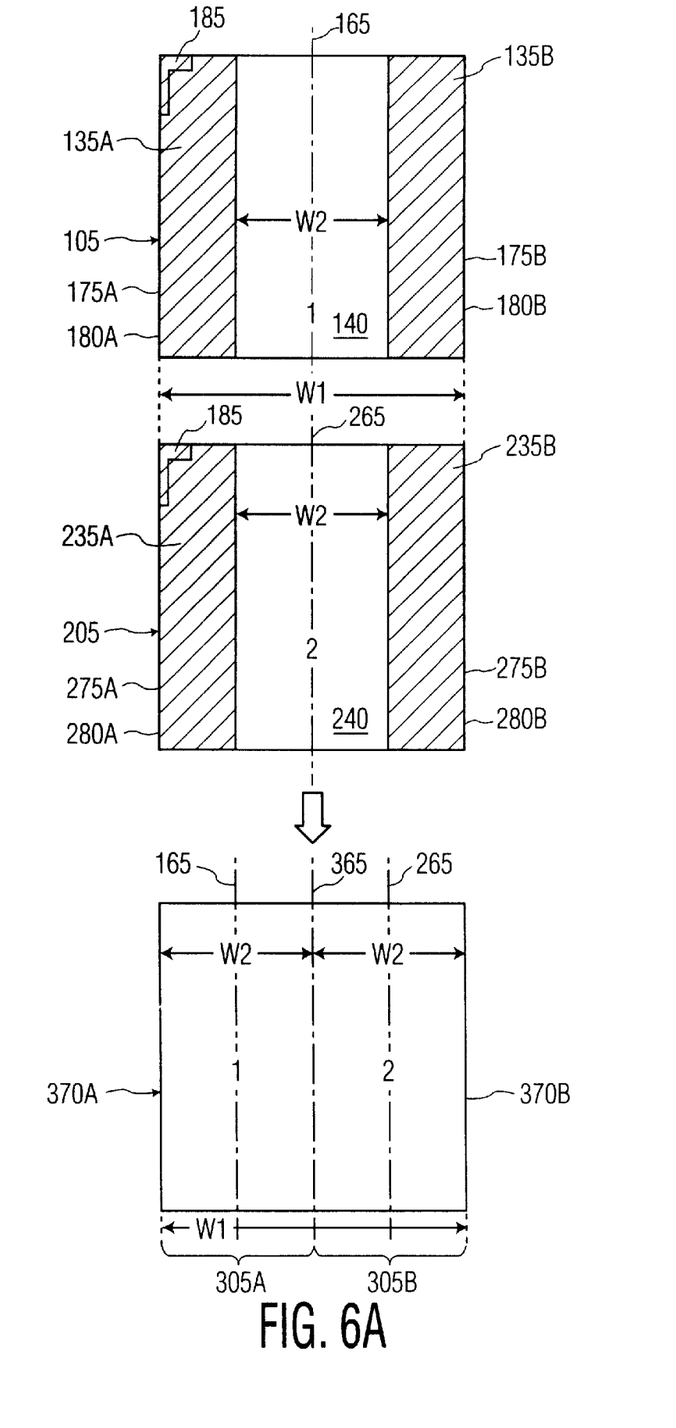
FIG. 6A is a detailed schematic diagram illustrating formation of increased resolution projected pixels according to a third embodiment of the present invention.

FIG. 6A is a detailed schematic diagram illustrating formation of increased resolution projected pixels according to a third embodiment of the present invention. In FIG. 6A, on first panel 160 (see FIG. 1C), pixel element 105 is partially masked by first and second opaque regions 135A and 135B and exposed through transparent region 140. Transparent region 140 straddles virtual reference line 165 and is located between first and second opaque regions 135A and 135B. An edge 175A of first opaque region 135A is aligned with a first edge 180A of pixel element 105 and an edge 175B of second opaque region 135B is aligned with a second and opposite edge 180B of pixel element 135B. Pixel element 105 has a width "W1" and a width "W2" of pixel element 105 is exposed. "W2"="W1"/2. In the present example, a substructure 185 of pixel element 105 is masked by opaque region 135A.

On second panel 260 (see FIG. 2C), pixel element 205 is partially masked by opaque region 235 and exposed through transparent region 240. Transparent region 240 straddles virtual reference line 265 and is located between first and second opaque regions 235A and 235B. An edge 275A of first opaque region 235A is aligned with a first edge 280A of pixel element 205 and an edge 275B of second opaque region 235B is aligned with a second and opposite edge 280B of pixel element 205. Pixel element 205 also has a width "W1" and a width "W2" of pixel element 205 is exposed. "W2"="W1"/2. In the present example, a substructure 285 of pixel element 205 is masked by opaque region 235A.

Pixel element 105 is projected to form pixel 305A and pixel element 205 is projected to form pixel 305B, the projection is done in a manner such that transparent pixels 305A and 305B abut along a virtual reference line 365. Virtual reference line 165 is positioned by optical-mechanical means to be midway between virtual reference line 365 and an outer edge 370A of pixel 305A and virtual reference line 265 is positioned by optical-mechanical means to be midway between virtual reference line 365 and an outer edge 370B of pixel 305B.

The third embodiment of the present invention may be applied to the vertical direction instead of the horizontal, as one skilled in the art will recognize.

Figure 6B:
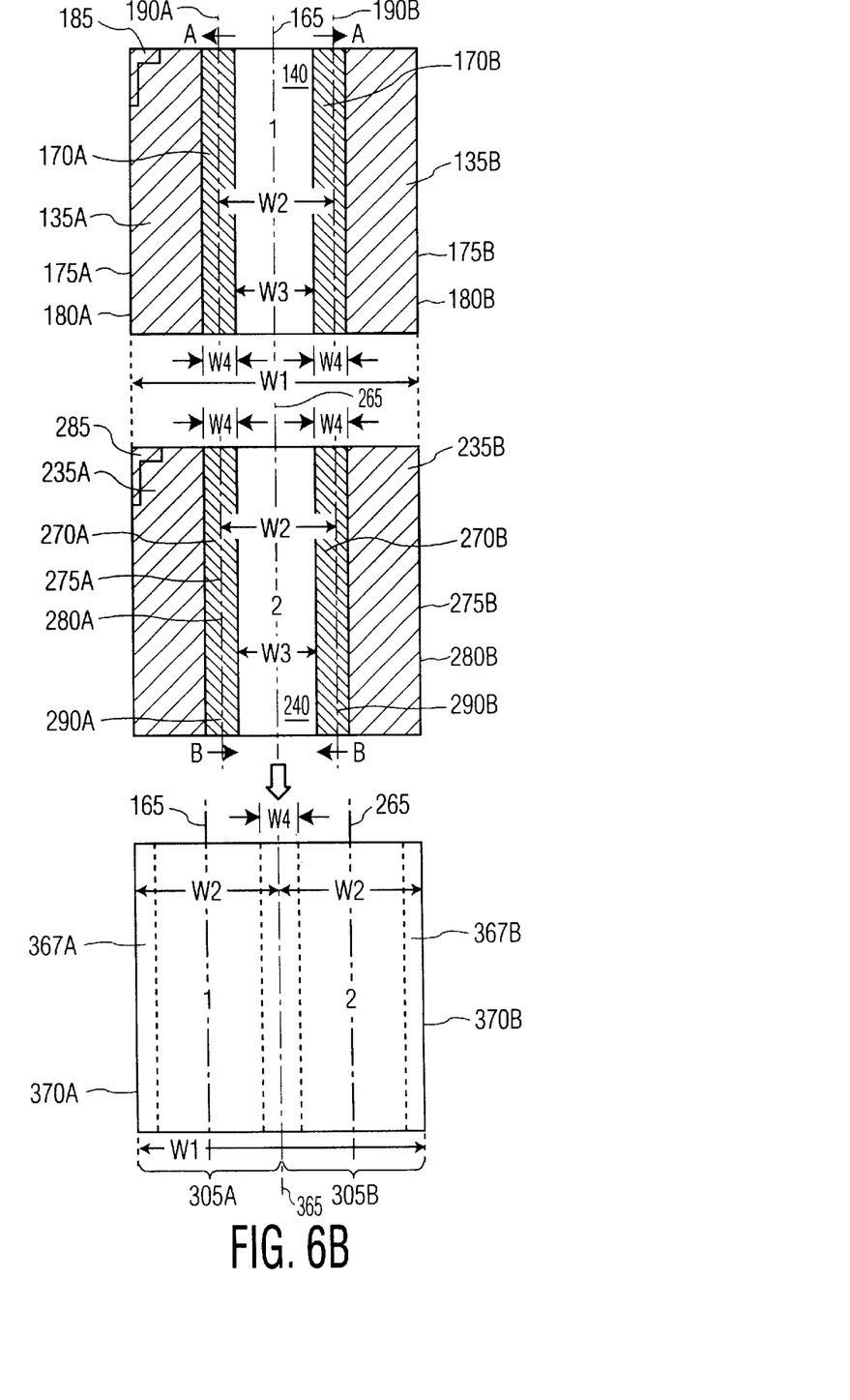
FIG. 6B is a detailed schematic diagram illustrating formation of increased resolution projected pixels according to a fourth embodiment of the present invention.

FIG. 6B is a detailed schematic diagram illustrating formation of increased resolution projected pixels according to a fourth embodiment of the present invention. In FIG. 6B, on first panel 160 (see FIG. 1C), pixel element 105 is partially masked by first and second opaque-regions 135A and 135B and exposed through transparent region 140. Transparent region 140 straddles virtual reference line 165 and is located between first and second opaque regions 135A and 135B. An edge 175A of first opaque region 135A is aligned with a first edge 180A of pixel element 105. An edge 175B of second opaque region 135B is aligned with a second and opposite edge 180B of pixel element 135B. First and second opaque region 135A and 135B are separated from transparent region 140 by first and second transition regions 170A and 170B respectively. First and second transition regions 170A and 170B are graded from opaque (optical density of opaque regions 135A and 135B) to transparent (optical density of transparent region 140) in the "A" direction. The optical density of first and second transition regions 170A and 170B along virtual reference lines 190A and 190B respectively is half of the sum of the optical density of first and second opaque region 135A and 135B and the optical density of transparent region 140. Transparent region 140 and opaque region 135 are equally spaced from virtual reference line 165. Pixel element 105 has a width "W1" and a width "W3" of pixel element 105 is exposed. Transition regions 170A and 170B each have a width "W4." "W4" may be between about 0 to 20% of "W1." "W2"=("W3"+"W4"/2)="W1"/2. In the present example, a substructure 185 of pixel element 105 is masked by opaque region 135A.

On second panel 260 (see FIG. 2C), pixel element 205 is partially masked by first and second opaque regions 235A and 235B and exposed through transparent region 240. Transparent region 240 straddles virtual reference line 265 and is located between first and second opaque regions 235A and 235B. An edge 275A of first opaque region 235A is aligned with a first edge 280A of pixel element 205. An edge 275B of second opaque region 235B is aligned with a second and opposite edge 280B of pixel element 205. First and second opaque region 235A and 235B are separated from transparent region 240 by first and second transition regions 270A and 270B respectively. First and second transition regions 270A and 270B are graded from opaque (optical density of opaque regions 235A and 235B) to transparent (optical density of transparent region 240) in the "A" direction. The optical density of first and second transition regions 270A and 270B along virtual reference lines 290A and 190B respectively is half of the sum of the optical density of first and second opaque region 235A and 235B and the optical density of transparent region 240. Transparent region 240 and opaque region 235 are equally spaced from virtual reference line 265. Pixel element 205 has a width "W1" and a width "W3" of pixel element 205 is exposed. Transition regions 270A and 270B each have a width "W4." "W4" may be between about 0 to 20% of "W1." "W2"=("W3"+"W4"/2)="W1"/2. In the present example, a substructure 285 of pixel element 205 is masked by opaque region 235A.

Pixel element 105 is projected to form pixel 305A and pixel element 205 is projected to form pixel 305B, the projection is done in a manner such that transparent pixels 305A and 305B abut along a virtual reference line 365. Virtual reference line 165 is positioned by optical-mechanical means to be midway between virtual reference line 365 and an outer edge 370A of pixel 305A and virtual reference line 265 is positioned by optical-mechanical means to be midway between virtual reference line 365 and an outer edge 370B of pixel 305B. Pixel 305A overlaps pixel 305B in overlap region 320. The overlap region minimizes frame distortion caused by misalignment of the optical projection system.

The fourth embodiment of the present invention may be applied to the vertical direction instead of the horizontal, as one skilled in the art will recognize.

Figure 7:
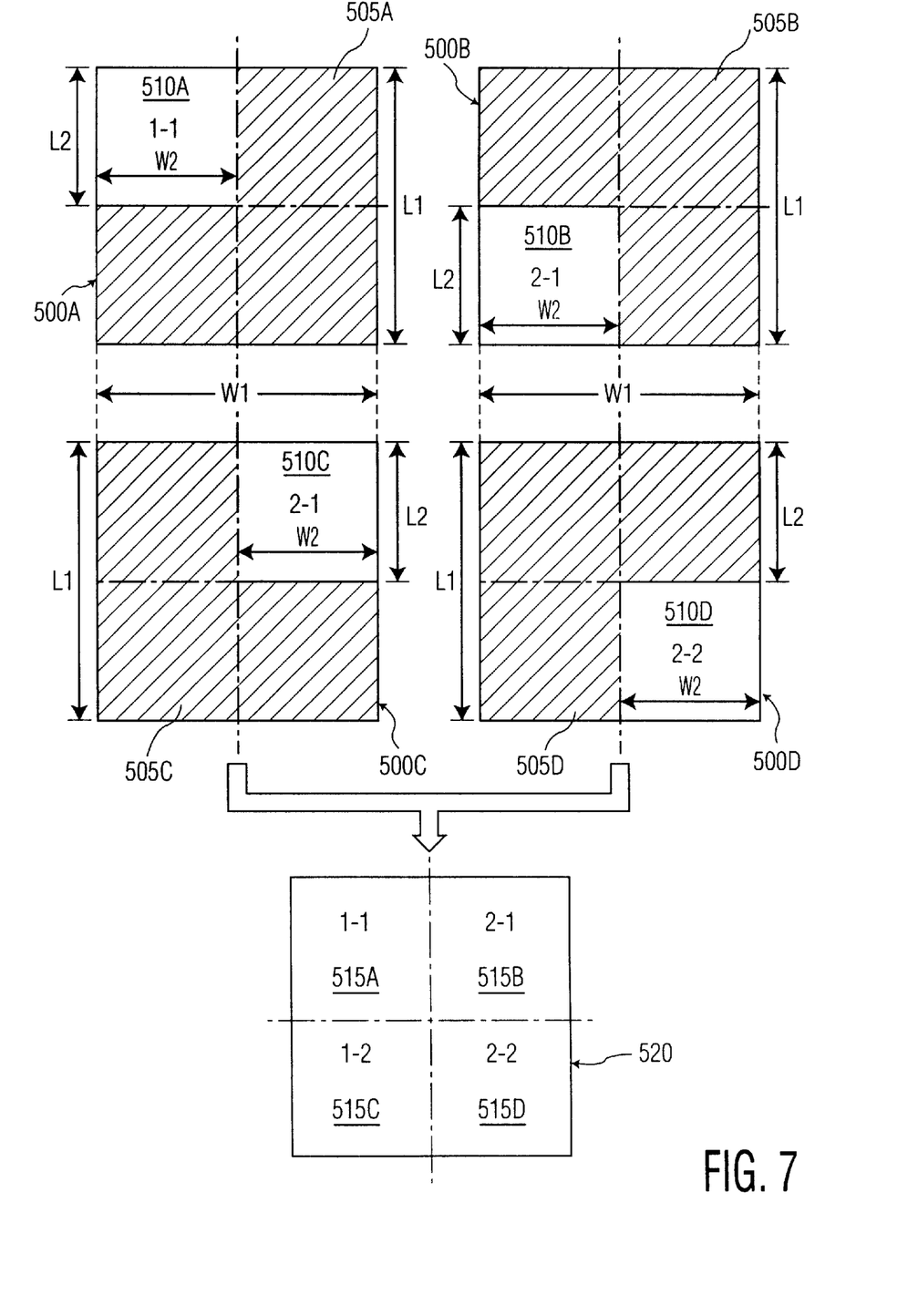
FIG. 7 is a detailed schematic diagram illustrating formation of increased resolution projected pixels according to a fifth embodiment of the present invention.

FIG. 7 is a detailed schematic diagram illustrating formation of increased resolution projected pixels according to a fifth embodiment of the present invention. In FIG. 7, a first pixel element 500A on a first panel (not shown) is partially masked by an opaque region 505A and exposed through a transparent region 510A. In the present example, clear region 510A occupies the upper left quadrant of pixel element 500A and opaque region 505A occupies the remaining three quadrants. First pixel element 500A is designated 1-1 for first row, first column of the projected image described infra.

A second pixel element 500B on a second panel (not shown) is partially masked by an opaque region 505B and exposed through a transparent region 510B. In the present example, clear region 510B occupies the lower left quadrant of pixel element 500B and opaque region 505B occupies the remaining three quadrants. Second pixel element 500B is designated 1-2 for first row, second column of the projected image described infra.

A third pixel element 500C on a third panel (not shown) is partially masked by an opaque region 505C and exposed through a transparent region 510C. In the present example, clear region 510C occupies the upper right quadrant of pixel element 500C and opaque region 505C occupies the remaining three quadrants. Third pixel element 500C is designated 2-1 for second row, first column of the projected image described infra.

A fourth pixel element 500D on a fourth panel (not shown) is partially masked by an opaque region 505D and exposed through a transparent region 510D. In the present example, clear region 510D occupies the lower right quadrant of pixel element 500D and opaque region 505D occupies the remaining three quadrants. Fourth pixel element 500D is designated 2-2 for second row, second column of the projected image described infra.

Pixel elements 500A, 500B, 500C and 500D have a width "W1" and a length "L1." Transparent regions 510A, 510B, 510C and 510D have a width "W2" and a length "L2." "W2"="W1"/2 and "L2"="L1"/2.

Light reflected off (or transmitted through) pixel elements 510A, 510B, 510C and 510D are projected to form pixels 515A, 515B, 515C and 515D of projected image 520. Thus, the resolution has been doubled in both the horizontal and vertical directions of interleaved image 520.

Figure 8:
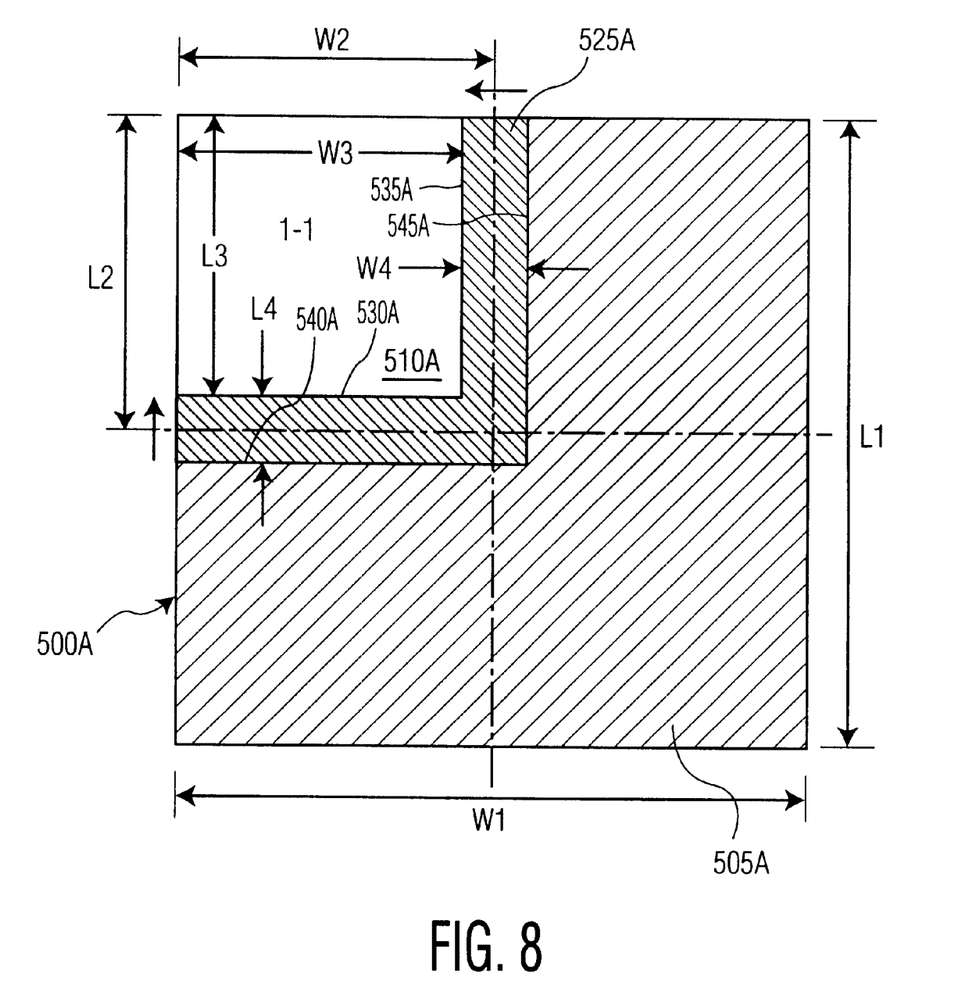
FIG. 8 is a detailed schematic diagram of single pixel element of a display panel according to a sixth embodiment of the present invention.

FIG. 8 is a detailed schematic diagram of single pixel element of a display panel according to a sixth embodiment of the present invention. In the sixth embodiment a transition region is applied to each pixel element of the fifth embodiment, however only pixel element 500A is illustrated. Pixel elements 500B, 500C and 500D are treated similarly to pixel element 500A. In FIG. 8, a transition region 525A is located between adjacent edges 530A and 535A of clear region 510A and respective opposing adjacent edges 540A and 545A of opaque region 505A. Transparent region 510A has a width of "W3" and a length of "L3." Transition region 525A has a width "W4." "W4" may be between about 0 to 20% of "W1. "W2"=("W3"+"W4"/2)= "W1"/2. "L2"=("L3"+"L4"/2)="L1"/2.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A pixelated image display system comprising:
   a first panel including an array of pixel elements, each pixel element partially masked by an opaque region;
   one or more additional panels, each additional panel including an array of pixel elements, each pixel element partially masked by an opaque region;
   means for directing a different subset of pixel data from an image dataset to each panel to control said pixel elements of each panel; and
   means for aligning and projecting interleaved pixel elements, in at least one of the horizontal and vertical directions, from each panel onto a screen to form a pixelated image.

2. The pixelated image display system of claim 1, wherein said panels reflect light.

3. The pixelated image display system of claim 1, wherein said panels transmit light.

4. The pixelated image display system of claim 1, wherein said array is selected from the group consisting of transmissive liquid crystal displays, deformable mirror devices, liquid crystal on silicon devices and reflective liquid crystal displays.

5. The pixelated image display system of claim 1, wherein the number of pixels in said pixelated image in the horizontal direction is the sum of the number of pixel elements in the horizontal direction of all of said panels or the number of pixels in said pixelated image in the vertical direction is the sum of the number of pixel elements in the vertical direction of all of said panels.

6. The pixelated image display system of claim 1:
   wherein, the number of pixels in said pixelated image in the horizontal direction is the sum of the number of pixel elements in the horizontal direction of a first set of panels, each panel in said first set of panels having vertically masked pixel elements; and
   wherein, the number of pixels in said pixelated image in the vertical direction is the sum of the number of pixel elements in the vertical direction of a second set of panels, each panel in said second set of panels having horizontally masked pixel elements.

7. The pixelated image display system of claim 1, wherein said opaque regions of each mask masks three quadrants of each pixel element on each panel, each panel having a different set of three quadrants masked.

8. A pixelated image display apparatus comprising:
   a first panel comprising an array of pixel elements and a mask having opaque regions and transparent regions overlaying said array, each pixel element partially masked by a portion of one of said opaque region of said mask;
   one or more additional panels, each additional panel comprising an array of pixel elements and a mask having opaque regions and transparent regions overlaying said array, each pixel element partially masked by a portion of one of said opaque regions of said mask; and
   means for projecting an interleaved image of the images formed on each panel.

9. The pixelated image display apparatus of claim 8, wherein the number of pixels in said pixelated image in the horizontal direction is the sum of the number of pixel elements in the horizontal direction of all of said panels or the number of pixels in said pixelated image in the vertical direction is the sum of the number of pixel elements in the vertical direction of all of said panels.

10. The pixelated image display apparatus of claim 8:
    wherein, the number of pixels in said pixelated image in the horizontal direction is the sum of the number of pixel elements in the horizontal direction of a first set of panels, each panel in said first set of panels having vertically masked pixel elements; and
    wherein, the number of pixels in said pixelated image in the vertical direction is the sum of the number of pixel elements in the vertical direction of a second set of panels, each panel in said second set of panels having horizontally masked pixel elements.

11. The pixelated image display apparatus of claim 8, further comprising transition regions between said opaque regions and said transparent regions.

12. The pixelated image display apparatus of claim 10, wherein the optical density of said transition regions continuously transitions from an optical density equal to the optical density of said opaque regions at interfaces of said transition regions and said opaque regions to an optical density equal to the optical density of said transparent regions at interfaces of said transition regions and said transparent regions.

13. The pixelated image display apparatus of claim 8, wherein said opaque regions form alternating transparent/ opaque stripe pairs in the vertical direction and aligned to each column of pixel elements or form alternating transparent/opaque stripe pairs in the horizontal direction and aligned to each row of pixel elements.

14. The pixelated image display apparatus of claim 8, wherein said opaque regions of each mask masks three quadrants of each pixel element on each panel, each panel having a different set of three quadrants masked.

15. The pixelated image display apparatus of claim 8, wherein said opaque regions of said masks mask non-reflective or non-transmissive substructures of each array element.

16. The pixelated image display apparatus of claim 8, wherein said array is selected from the group consisting of transmissive liquid crystal displays, deformable mirror devices, liquid crystal on silicon devices and reflective liquid crystal displays.

17. A method of forming a pixelated image comprising:
providing a first panel comprising an array of pixel elements and a mask having opaque regions and transparent regions overlaying said array, each pixel element partially masked by a portion of said opaque region of said mask;
providing one or more additional panels, each additional panel comprising an array of pixel elements and a mask having opaque regions and transparent regions overlaying said array, each pixel element partially masked by a portion of one of said opaque regions of said mask; and
projecting an interleaved image of the images formed on each panel.

18. The method of forming a pixelated image of claim 17, wherein the number of pixels in said pixelated image in the horizontal direction is the sum of the number of pixel elements in the horizontal direction of all of said panels or the number of pixels in said pixelated image in the vertical direction is the sum of the number of pixel elements in the vertical direction of all of said panels.

19. The method of forming a pixelated image of claim 17:
wherein, the number of pixels in said pixelated image in the horizontal direction is the sum of the number of pixel elements in the horizontal direction of a first set of panels, each panel in said first set of panels having vertically masked pixel elements; and
wherein, the number of pixels in said pixelated image in the vertical direction is the sum of the number of pixel elements in the vertical direction of a second set of panels, each panel in said second set of panels having horizontally masked pixel elements.

20. The method of forming a pixelated image of claim 17, further comprising providing transition regions between said opaque regions and said transparent regions.

21. The method of forming a pixelated image of claim 20, wherein the optical density of said transition regions continuously transitions from an optical density equal to the optical density of said opaque regions at interfaces of said transition regions and said opaque regions to an optical density equal to the optical density of said transparent regions at interfaces of said transition regions and said transparent regions.

22. The method of forming a pixelated image of claim 17, wherein said opaque regions form alternating transparent/opaque stripe pairs in the vertical direction and aligned to each column of pixel elements or form alternating transparent/opaque stripe pairs in the horizontal direction and aligned to each row of pixel elements.

23. The method of forming a pixelated image of claim 17, wherein said opaque regions of each mask masks three quadrants of each pixel element on each panel, each panel having a different set of three quadrants masked.

24. The method of forming a pixelated image of claim 17, wherein said opaque regions of said masks mask non-reflective or non-transmissive substructures of each array element.

25. The method of forming a pixelated image of claim 17, wherein said array is selected from the group consisting of transmissive liquid crystal displays, deformable mirror devices, liquid crystal on silicon devices and reflective liquid crystal displays.

* * * * *